United States Patent [19]

Bedrij

[11] Patent Number: 4,695,975

[45] Date of Patent: Sep. 22, 1987

[54] MULTI-IMAGE COMMUNICATIONS SYSTEM

[75] Inventor: Orest J. Bedrij, Poughkeepsie, N.Y.

[73] Assignee: Profit Technology, Inc., New York, N.Y.

[21] Appl. No.: 663,893

[22] Filed: Oct. 23, 1984

[51] Int. Cl.⁴ .......................... G06F 3/14; G06F 3/16
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,256,386 | 6/1966 | Morchand | 178/5.6 |
| 4,053,740 | 10/1977 | Rosenthal | 364/705 |
| 4,104,625 | 8/1978 | Bristow et al. | 340/324 R |
| 4,213,189 | 7/1980 | Mueller et al. | 364/100 |
| 4,278,838 | 7/1981 | Antonov | 179/1 SM |
| 4,301,503 | 11/1981 | Frederiksen | 364/200 |
| 4,305,131 | 12/1981 | Best | 364/521 |
| 4,333,152 | 6/1982 | Best | 364/521 |
| 4,357,014 | 11/1982 | Baer et al. | 273/85 G |
| 4,416,182 | 11/1982 | Wise et al. | 84/470 R |

FOREIGN PATENT DOCUMENTS 8303914 11/1983 PCT Int'l Appl. .

OTHER PUBLICATIONS

R. D. Gordon, "An Intelligent Electronic Book System and Publishing Facility," GLOBE COM '82 IEEE Global Telecommunications Conference vol. 3, Nov. 29—Dec. 2, 1982, pp. 1365–1369.

Carbonell et al, "Steps Toward Knowledge-Based Machine Translation," IEEE Transactions on Pattern Analysis and Machine Intelligence, vol. PAMI-3, No. 4, Jul. 1981, pp. 376–392.

P. J. Kennedy, "Video-enhanced Computer-aided Teaching System," IBM Technical Disclosure Bulletin, vol. 216, No. 2B, Aug. 1983, pp. 1487–1488.

ADDA Corp. Brochure, "Electronic Still Processor ESP C Series Digital Storage and Retrieval System," ADDA Corp., 1671 Dell Avenue, Campbell, Calif. 95008 (10 pages).

Wiggins & Brantingham, "Three-Chip System Synthesizes Human Speech," Electronics (Aug. 31, 1978) pp. 109–116.

Primary Examiner—Thomas M. Heckler

[57] ABSTRACT

A device for automatic translation of natural language words into corresponding visual images has an addressable video disc memory storing a large number of images, an image dictionary memory for storing the video disc addresses for sets of images for respective natural language words along with information controlling the selection and display of the respective images, and a computer for addressing the image diictionary memory and interpreting the selection and display information. The translation device is advantageously used in an audio-visual presentation system which also includes a speech synthesizer and a multiple display synchronized to the pronunciation of the speech synthesizer. Preferably, the selection of images is responsive to viewer preferences and the context of the translated words, and redundancy of image presentation is eliminated by random or indexed selection.

41 Claims, 16 Drawing Figures

MULTI-IMAGE COMMUNICATIONS SYSTEM

TECHNICAL FIELD

This invention relates to audio-visual systems for transmitting information at high speed to a human receiver.

BACKGROUND ART

The driving force behind the technological development of mankind has been the ability to permanently record the achievements of past generations for selective distribution to new generations. The invention of a written language, and more recently printing and moveable type, has led to an accumulation of knowledge so vast that it cannot be absorbed by a single individual. With recent advances in electronic data storage, it is becoming possible to catalog and index this accumulation of knowledge so that selected portions are immediately accessible.

The primary purpose of accumulating and recording knowledge has been for direct human assimilation of selected portions. Although intelligent machines may eventually be developed for direct assimilation and comprehension of information, at the present time the primary end use of recorded information is for assimilation and comprehension by a human receiver. It has also become relatively easy to record, select and distribute information to human individuals in comparison to the time and effort required for a human individual to assimilate and comprehend the information. At the same time, society demands that its members should assimilate a greater quantity of information, as evidenced by the increasing number of years young persons devote to formal education.

Technology has offered some means of increasing the rate at which information can be assimilated by a human receiver. Advances in the printing art have made writings easier to read as well as universally available. More recently, the printed page has been supplanted to some degree by the rapid projection of a series of visual images in motion pictures and television. Modern psychology has verified the ancient observation that "a picture is worth a thousand words" by demonstrating that information in visual form is assimilated into a person's memory at a much greater rate than in verbal form. Although it is open to question whether comprehension is primarily a verbal as distinguished from a visual-based process, it is evident that the visual mode of assimilating information can be advantageously combined with the verbal mode. To some extent, the enhanced assimilation of audio-visual information has made up for a lack of adequate preparation of the message in a clear and concise form, or in the words of a mass media promoter, "the medium is the message." Multi-image presentations, employing the simultaneous projection of a plurality of distinct visual images along with an audio message, have exploited these principles.

Recent advances in electronics have made it possible to store, retrieve, and process individual frames of visual information. In contrast to sequential storage on video tape, random access semiconductor memory and video discs have been used for the real-time modification of the visual image. In video games, the displayed image is responsive to a player's actions. For television broadcast as well as for special effects in movie making, specialized digital electronic systems have been developed for storing, retrieving, and synthesizing video images.

One well-known kind of digital electronic video processor is called an "Electronic Still Processor" which is used primarily by the television broadcast industry. A representative processor is the "Electronic Still Processor ESP C Series Digital Storage And Retrieval System" manufactured and sold by ADD A Corp. 1671 Dell Avenue, Campbell, Calif. 95008. The ESP C Series processor includes an analog/digital conversion system, a microprocessor control system accessed via a control panel, and up to four hard disk drives for on-line storage of up to 3,000 frames or still images. The processor can retrieve any frame within less than half a second. The processor accepts inputs from conventional video sources such as video tape as well as synthetic sources such as character or special effects generators.

The individual frames can be edited to obtain any desired sequence or rate of play-back to generate a conventional television broadcast signal. The processor also has dual channel outputs so that one channel can be displayed while recording another, and one image can be superimposed on another. The processor may be used with an optional computerized Library Control System that provides off-line catalog, index, and reference information for searching or sorting stills based on title, category, geography, still number, source or date. The processor also supports an optional multiple frame or multiplex feature which compresses, recalls, and positions up to twenty-five stills on a video monitor in a $3 \times 3$ or $5 \times 5$ matrix format.

SUMMARY OF THE INVENTION

The primary object of the present invention is to increase the rate at which general information can be conveyed to and assimilated by a human receiver.

A secondary object of the invention is to provide improved communication.

Another object of the invention is to provide automatic computer generated programming for multi-image presentation.

Yet another object of the invention is to provide a computerized multi-image processor.

A specific object of the present invention is to provide an improved learning aid.

Still another object of the invention is to provide an improved means for teaching foreign languages.

And yet another object of the invention is to provide a system for decreasing the time and cost required for formatting multi-image presentations.

BRIEF DESCRIPTION OF THE DRAWINGS

Other objects and advantages of the invention will become apparent upon reading the attached detailed description and upon reference to the drawings in which.

While the invention has been described in connection with certain preferred embodiments, it will be understood that there is no intention to limit the invention to the particular embodiments shown, but it is intended, on the contrary, to cover the various alternative and equivalent forms of the invention included within the spirit and scope of the appended claims.

DETAILED DESCRIPTION OF THE PREFERRED EMBODIMENTS

Figure 1:
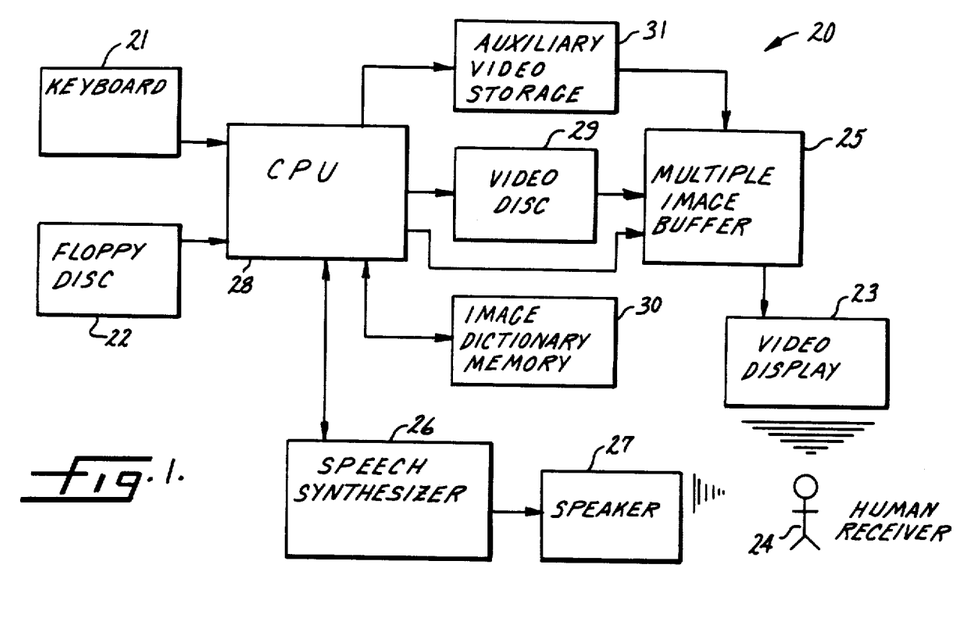
FIG. 1 is a general block diagram of a multi-image communication system according to the present invention.

Turning now to FIG. 1 there is shown a general block diagram of a preferred embodiment generally designated 20 of the multi-image communications system according to the present invention. The system 20 receives natural language words or text at an input means such as a keyboard 21 or floppy disk drive 22 and translates the natural language words into a sequence or presentation of corresponding video images presented by a video display 23 to a human receiver 24. Preferably, the display 23 can present multiple images which are built up and temporarily stored in a multiple image buffer 25.

In accordance with another important aspect of the present invention, the multi-image communications system includes a standard speech synthesizer 26 which also receives the natural language words or text and drives a speaker 27 to pronounce the text in synchronism with the display of the corresponding images. A preferred form of construction for the speech synthesizer is disclosed in Antonov U.S. Pat. No. 4,278,838 issued July 14, 1981 and titled "Method Of And Device For Synthesis Of Speech From Printed Text" herein incorporated by reference. In particular, the speech synthesizer 26 includes a phoneme dictionary which prestores in digital form the voice elements of human speech. Suitable circuits for converting selected ones of the phonemes to an analog signal for driving the speaker 27 are manufactured and sold by Texas Instruments, Inc., of Dallas, Tex. as integrated circuit part no. TMC0280. The use of the TMC0280 is generally described by Richard Wiggins and Larry Brantingham, "Three-chip system synthesizes human speech," *Electronics,* Aug. 31, 1978, pp. 108–116.

In the preferred system, a central processing unit or microcomputer 28 such as an IBM PC or personal computer, buffers the text from the keyboard 21 or floppy disk 22 for presentation to the speech synthesizer 26.

According to another important aspect of the present invention, a laser video disk 29 stores a large number of images at addressable locations, and the natural language words are translated into corresponding ones of these video images by the addressing of an image dictionary memory 30 storing sets of video addresses for respective ones of the natural language words. In addition to the main video disk 29, the system 20 may include auxiliary video storage 31 such as a secondary video disk to increase the video storage capacity of the system or to provide video images for specialized subject areas. The auxiliary video storage 31 could also include storage for predetermined graphic, alphabetic or character symbols.

Figure 2:
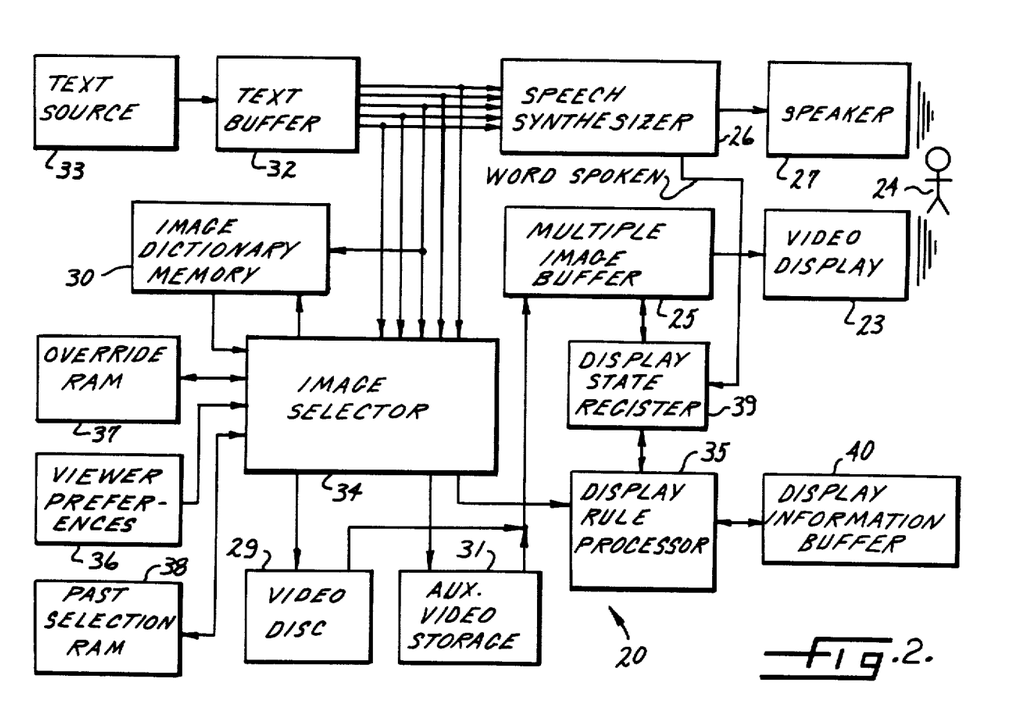
FIG. 2 is a block diagram of the preferred embodiment of the present invention.

Turning now to FIG. 2 there is shown a more detailed functional block diagram of the system 20 shown in FIG. 1. The functions shown in FIG. 2 represent the system shown in FIG. 1 after a control program has been loaded from the floppy disk 22 into the central processing unit 28. Then the central processing unit 28 functions as a text buffer 32 for receiving the natural language words from a text source 33 such as the keyboard 21 or floppy disk 22. The central processing unit 28 also functions as an image selector 34 for selecting, for particular predetermined natural language words, a corresponding image stored in the video disk memory 29 for display. The central processing unit 28 also performs the function of a display rule processor 35 for loading the multiple image buffer 25 and determining how the particular images are to be displayed. The display rule processor determines, for example, how long a particular image is to be displayed, and determines what images should not be displayed when there is insufficient time for displaying all of the images selected by the image selector 34.

In accordance with an important aspect of the present invention, the image dictionary memory includes, for the respective images referenced therein, respective selection rules for specifying particular methods by which respective images are selected for display for the substantial number of natural language words included in the image dictionary memory 30. These selection rules include context rules wherein respective images are selected in response to the natural language words currently stored in the text buffer, as well as viewer preference descriptions for specifying whether respective images meet predetermined viewer preferences 36. The viewer preferences 36 are received from the particular viewer, for example from the keyboard 21 in FIG. 1, and indicate whether the images presented on the video display 23 should be selected or tailored for the particular viewer. The viewer preferences indicate, for example, whether the images should be tailored for a viewer having a particular age, sex, nationality, ethnic background, or historical perspective.

For the selection of particular images, the image dictionary memory 30 may also have special control rules associated with particular images or particular natural language words which override the typical operation of the image selector 34. These special control rules, for example, may indicate that the images representing a particular natural language word should be selected in a particular way. These special control rules may be represented as control words interspersed in the natural language text. Such control words are not pronounced by the speech synthesizer and can be used to edit the video presentation. Of particular importance are control words for displaying a particular image in the video disk 29 or the auxiliary video storage 31, or for preventing a particular image from being displayed. A list of desirable control words is shown in Appendix II. Control words are also provided for changing or overriding the operation of the display rule processor 35 by modifying the display rules that are read from the image dictionary memory 30 by the image selector 34.

The image selector 34 operates cyclically upon receiving individual natural language or control words from the text buffer 32. Some of the control words received from the text buffer 32 and special control rules from the image dictionary memory 30, however, require the image selector 34 to change its operation over a number of cycles or words received from the text buffer 32. In order to remember that these operations are to be performed over a successive number of cycles or words, an override random access memory 37 is provided. The override random access memory 37 stores, for example, data indicating what control operation is to be performed for the next word received from the text buffer 32, and may buffer information about particular images received from the image dictionary memory 30. For a "SEQUENTIAL" operation, information about a number of images is buffered into the override random access memory 37 for the display of one image for each following word spoken by the speech synthesizer 26.

Even after applying the context rules, viewer preference descriptions, and special control rules there may still be a number of permissible images for the translation of a single natural language word. To avoid redundant selection of a particular one of these permissible images, a single permissible image can either be selected at random from the set of permissible images, or a single permissible image can be selected based on the past history of image selection. For selecting an image based on past history, a past selection random access memory 38 is provided.

Once the image selector has selected an image for display, the selected image along with its respective display rules are passed to the display rule processor 35. The display rule processor 35 determines where the selected image is to be loaded in the multiple image buffer 25. A display state register 39 is provided for indicating the status of the multiple image buffer 25. The display state register 39 is responsive to the time when particular words are spoken by the speech synthesizer 26. In particular, the multiple image buffer 25 stores images currently being displayed and images that have been loaded for display when the next word is spoken by the speech synthesizer 26. The display of a particular image, in other words, is delayed so that the image for a particular word is displayed when the particular word is spoken by the speech synthesizer 26.

Due to time constraints, it is possible that an image will not be displayed for as long as desired, but rather it will be overwritten so that another image can be displayed. A particular display rule, for example, assigns a priority number to each image and the decision of whether to terminate the display of one image to display a new image is responsive to the respective priority numbers. In order to store the priority numbers and other information about the images in the multiple image buffer, a display information buffer or memory 40 is provided.

Figure 3:
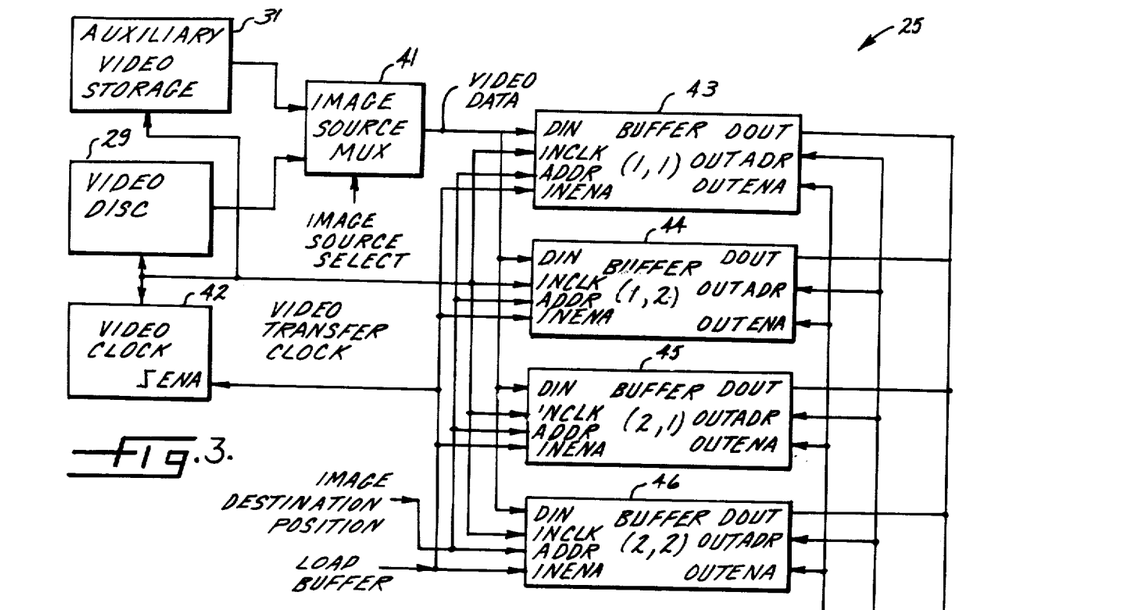
FIG. 3 is a block diagram of a multi-image display and associated image buffers which can be advantageously used for a learning system according to the present invention.

Turning now to FIG. 3 there is shown a block diagram for a kind of multiple image buffer 25 for use with a high resolution color flat display 23 such as a cathode ray tube. This kind of multiple image buffer would also be useful for working with a display 23 such as a standard color television set. A multiple image buffer 25 receives the video information from either the video disk 29 or auxiliary video storage 31 as determined by an image source multiplexer 41. The actual transfer of the video information is synchronized to a video clock 42 and transfer is initiated by the rising edge of a LOAD BUFFER signal.

The multiple image buffer 25 includes four double buffers 43, 44, 45, and 46 for the four matrix locations (1,1), (1,2), (2,1), (2,2) of the display 23. The image selected by the image source multiplexer 41 is received by a respective one of these buffers as determined by an IMAGE DESTINATION POSITION address. Each buffer includes a memory for storing the image currently being displayed and a second memory for receiving an image to be displayed at a later time. In order to display the images stored in these first memories, a raster scan generator 47 generates a clocking signal synchronized to the scanning of the display 23 and this clocking signal is converted to respective memory address locations by a pixel counter 48. The video data, in binary or digital form, is received by video digital-to-analog converters 49 for generating a video signal to modulate the color grids of the cathode ray tube display 23.

Figure 4:
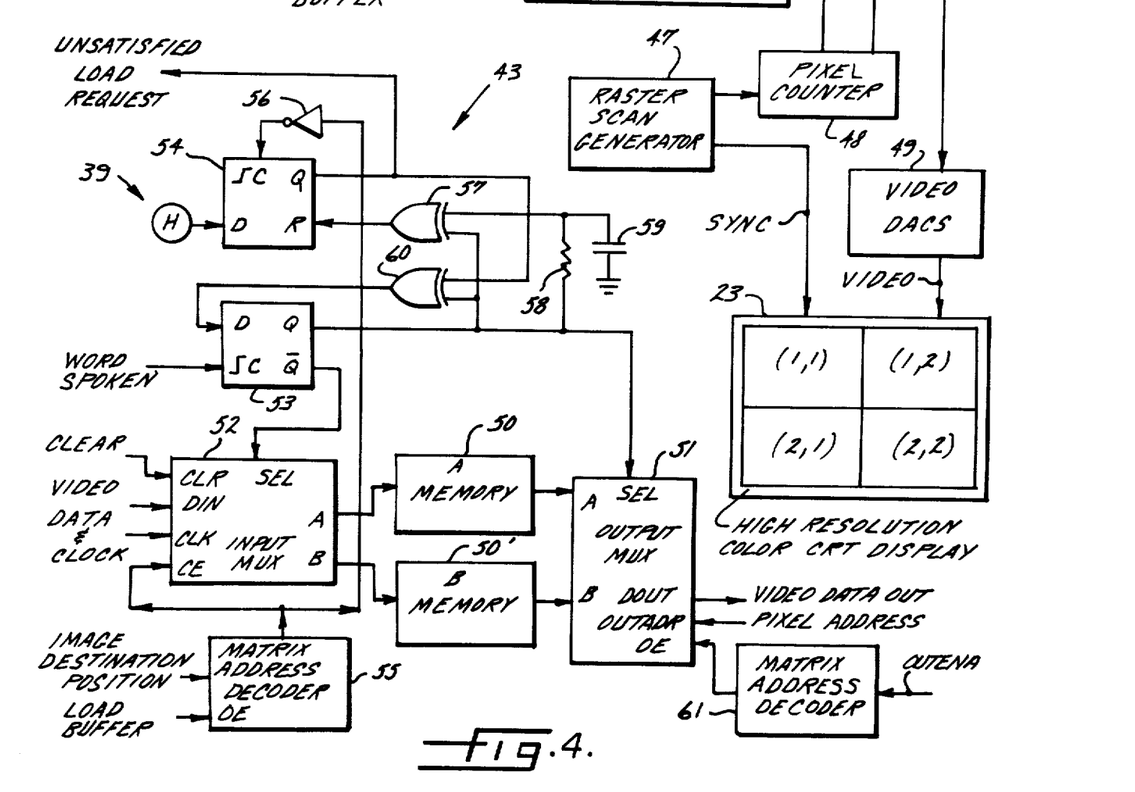
FIG. 4 is a detailed circuit diagram of one of the image buffers in FIG. 3.

Turning now to FIG. 4 there is shown a schematic diagram of one of the buffers 43-46. Specifically shown are the two memories 50 and 50'. Each of these memories may function as either an image loading memory or an image display memory as determined by input and output multiplexers 51 and 52. The choice of which memory is used for loading and which is used for display is selected by a delay type flip-flop 53 which is clocked by the WORD SPOKEN signal from the speech synthesizer 26 (FIG. 2) in order that images are displayed at the beginning of the pronunciation of the natural language words. Since the WORD SPOKEN signal is asynchronous with respect to the loading of the video information into the buffers 43-46, a handshake flip-flop 54 recognizes a loading request initiated by the LOAD BUFFER signal. The LOAD BUFFER signal is gated by a matrix address decoder 55 provided so that the image is loaded only into the addressed buffer 43-46. An inverter 56 inverts the enable signal from the matrix address decoder 55 in order that the handshake flip-flop 54 is set after the video data is loaded into the memory 50, 51 selected for receiving a new image. The handshake flip-flop 54 is reset after the selection determining flip-flop 53 is triggered by the WORD SPOKEN signal using a reset pulse generating circuit comprising an exclusive-OR gate 57 and a lowpass filter comprising a series resistor 58 and a shunt capacitor 59. The memory selecting flip-flop 53 functions as a toggle flip-flop since a second exclusive-OR gate 60 determines the state of the data input (D) to the delay flip-flop 53 depending upon the logic state of its output (Q).

The input multiplixer 52 includes a clear input (CLR) in addition to a video data input (DIN). The clear input (CLR) gates the video data input (DIN) so that a clear video image is loaded when the clear input is a logic high regardless of the video data received on the video data input (DIN). The output multiplexer 51 is enabled by a matrix address decoder 61 receiving an out enable address (OUTENA) provided by the pixel counter 48.

Figure 5:
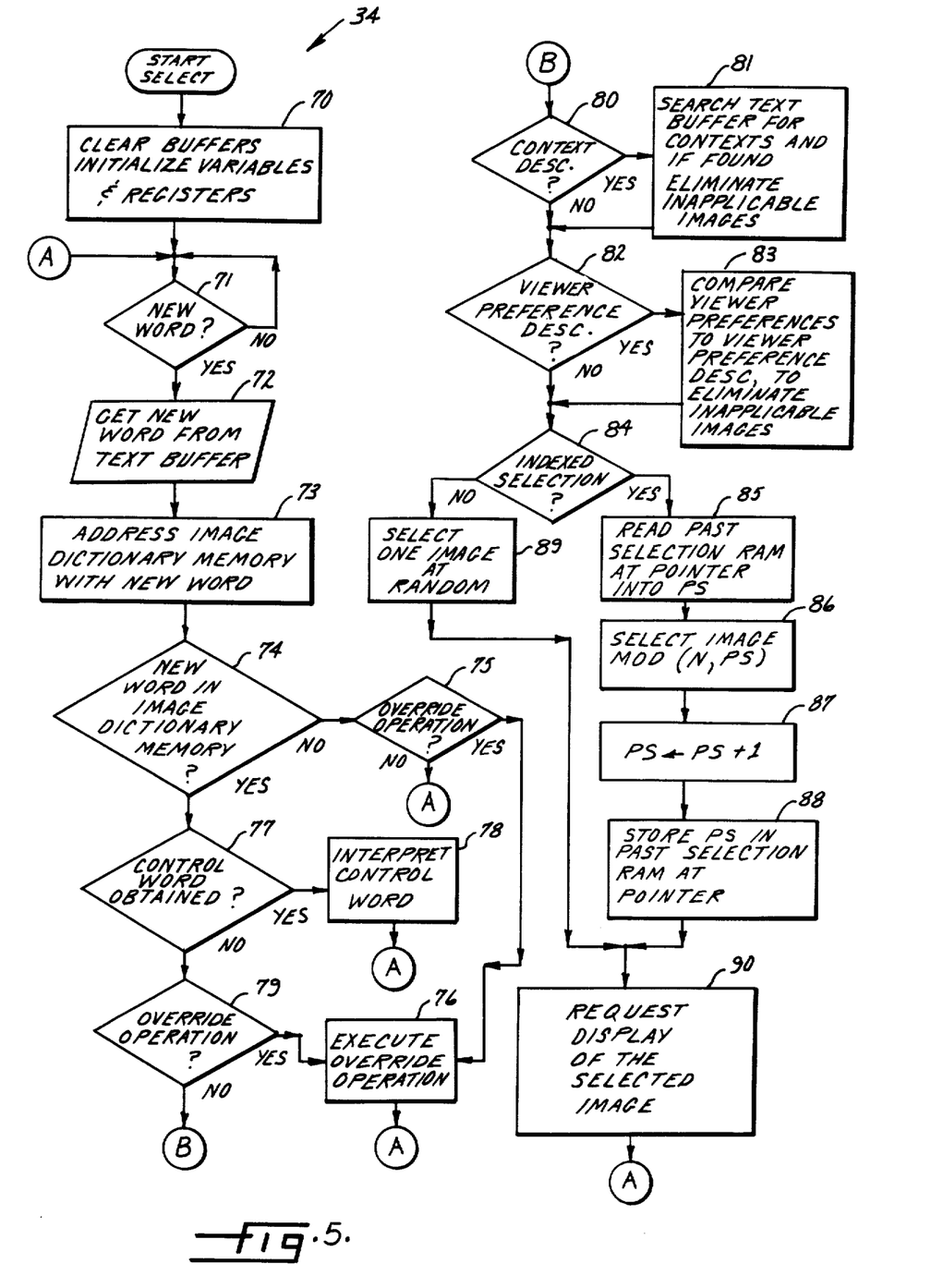
FIG. 5 is a flowchart of a computer procedure which implements the image selector logic or selector means in the preferred embodiment of FIG. 2.

Turning now to FIG. 5 there is shown a flowchart of a control procedure executed by the central processing unit 28 (FIG. 1) to implement the image selector 34 (FIG. 2). In the first step 70 the buffers such as the override random access memory 37 and the past selection RAM 38 are cleared and variables used in the image selector procedure are initialized. In step 71 a word synchronization signal is received from the text buffer 32 and the synchronization signal is monitored until a new word is available from the text buffer. In step 72 the new word is obtained from the text buffer and used in step 73 to address the image dictionary memory 30 with the new word.

The contents of the image dictionary memory 30 are illustrated in Appendix I. The listing in Appendix I, for example, is generated by a translator from a compressed internal binary format. The image dictionary memory includes a concordance listing a substantial fraction of the natural language words received from the text source 33 and linking these natural language words with a set of video addresses for corresponding images stored in the video disk 24 or the auxiliary video storage 31. The concordance also includes some special control rules indicating how a particular image, from the set of available images, is obtained for each of the natural language words listed in the concordance. The default rule is to select a single image at random from the set of available images. Another special control rule is to select a particular one of the images on an indexed basis in response to an index value stored in the past selection RAM 38 for particular ones of the natural language words listed in the concordance. Another special control rule is to select a plurality of images but to display the plurality of images sequentially, only one image being displayed coincident with the pronunciation of a single spoken word. Special control rules are also used to reduce the size of the concordance. The special rule "SEE" is interpreted to link a particular word listed in the concordance with other words which include more detailed information on how to obtain corresponding images.

Figure 6:
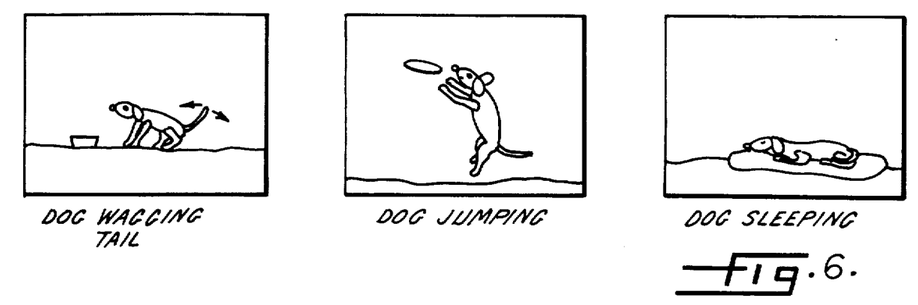
FIG. 6 is a pictorial representation of the three images corresponding to the image descriptions in the image dictionary memory listing of Appendix I.

Roughly translated, the concordance of Appendix I includes an entry for the word "DOG" including three corresponding images described as "DOG WAGGING TAIL", "DOG JUMPING", and "DOG SLEEPING". These three images are shown in FIG. 6. The control word INDEXED means that the following number in brackets is the absolute address of the corresponding index in the past selection random access memory 38. The concordance entry for the word MUT indicates that when the dictionary memory is addressed with the word MUT, the video images should be obtained by addressing the word DOG. The concordance entry PET indicates that the set of images for the word PET should be obtained by selecting at random either the images associated with the word DOG or the images associated with the word CAT. The percentage signs indicate that although the selection is random, 60% of the time the images for the word DOG should be used, while for 40% of the time the images for the word CAT should be used.

The concordance entry for the word WAR includes a special CONTEXT control rule. A word listed in the concordance may include a number of contexts, each context being identified by a descriptor indicating words in the text buffer 32 that must be present or absent for the following images to be selected. The descriptor NUCLEAR/1 for example, means that the word NUCLEAR must be within one word position of the word WAR in order for the following images to be selected. Roughly translated, the concordance entry for the word WAR means that if the word NUCLEAR is found in the text buffer 32 within one word position of the word WAR, then three images should be sequentially displayed and the three images should be obtained by respectively selecting an image associated with the word ICBM, NUCLEAR EXPLOSION, and RUINS.

In addition to a concordance, the image dictionary memory includes image descriptions having, for each addressable image in the video disk 29 or the auxiliary video storage 31, respective selection and display rules. For the image, "DOG WAGGING TAIL", for example, the image is stored on the second video disk at track number 147, the image should be displayed for a maximum time of three seconds, and must be displayed for a minimum time of 0.3 seconds, the image has a priority of three and no viewer preferences, and in the context of the word WAGGING occurring within seven words of the word DOG in the text buffer 32, then the minimum viewing time must be increased to 0.5 and the priority also should be increased to 5. The priority and viewing time, for example, are increased since if the context description is satisfied, the "DOG WAGGING TAIL" is a more relevant picture to be displayed and it should be displayed for a longer time so that the viewer has time to notice that the dog is wagging its tail.

Returning now to FIG. 5, once the permissible images are obtained from the dictionary memory which are associated with the new word from the text buffer, then in step 74 the response from the image dictionary memory must be inspected to determine whether any images at all were obtained. In other words, the image dictionary memory 30 does not list in its concordance every signal word of a natural language. Some words just are not important enough to have associated with them specific video images. It should be noted, however, that due to the context rules the ideas symbolically represented by such words might still be conveyed by images associated with some other words which are listed in the concordance. If in step 74 the new word is not in the image dictionary memory, then in step 75 the override RAM 37 is inspected to determine whether there are any override operations yet to be performed to display an image when the new word will be pronounced by the speech synthesizer 26. If a prior SEQUENTIAL operation, for example, was requested for the previous word in the text buffer 32, this fact will be indicated in the override random access memory 37 so that in step 76 the override operation may be executed. For the SEQUENTIAL operation, for example, the override random access memory 37 includes information about an image to be displayed when the new word is pronounced by the speech synthesizer 26.

If in step 74 the new word was found in the image dictionary memory, then in step 77 the new word and the results from the image dictionary memory are inspected to determine whether a control word was obtained. If a control word was obtained, then in step 78 that control word is interpreted to modify the usual sequence of the image selector 34 or the display rule processor 35. The control words are interpreted, for example, to perform the functions listed in Appendix II. If a control word is not obtained in step 77, then in step 79 the override random access memory 37 is inspected to determine whether an override operation is left over from a previous word cycle of the image selector 34. If so, then in step 76 the override operation is completed as was described above.

If an override operation was not found in step 79, then in step 80 the information from the image dictionary memory is inspected to determine whether any of the permissible images received from the image dictionary memory have context descriptions. If so, in step 81 the text buffer 32 is inspected to determine whether any of the contexts are applicable to the text in the buffer, and if any of the contexts are found to be applicable, the inapplicable images from the image dictionary memory 30 are eliminated from the permissible set of images from which an image to display is selected. If in step 80 no context descriptions were found, then in step 82 the information from the image dictionary memory 30 is inspected to determine whether there are any viewer preference descriptions associated with the permissible set of images. If there are, then in step 83 the viewer preferences 36 (FIG. 2) are compared to the viewer preference descriptions and any inapplicable images are eliminated from the set of permissible images from which an image to display is selected.

The final step in image selection applies either the random selection method or the indexed selection method described above. In step 84, the information from the image dictionary memory 30 is inspected to determine whether an INDEXED control word was associated with the set of images obtained from the image dictionary memory. If so, then in step 85, the past selection RAM 38 is read at the pointer address of the index and the index value is read into the variable PS. In step 86 a selector number is obtained by taking the modulus or remainder generated by dividing the index value PS by the number N of permissible images from which an image for display is to be selected. The modulus or remainder is a number from zero to N−1 pointing to or selecting a respective one of the N possible images. This image is selected and an attempt will be made by the display rule processor 35 to display the selected image when the new word is spoken by the speech synthesizer 26. The index value PS is incremented in step 87 and in step 88 is stored back in the past selection random access memory 38 at the respective pointer address in order to eliminate redundant selection of the images for the same natural language word associated with the particular index addressed at the particular pointer value.

If in step 84 indexed selection was not indicated, then in step 89 a random selection is performed. For random selection, the value PS is generated by a random number generator subroutine and as in step 86 the modulus or remainder is obtained by dividing the value PS by the number N in order to obtain a number from zero to N−1 which selects a particular one of the N possible images for display purposes. If percentages were assigned to the images, the number N is set to 100 and the percentages are converted to ranges within which the modulus may fall to select one of the images. For the word PET discussed above, a modulus of 0-59 will select a DOG image and a modulus of 60-99 will select a CAT image. In step 90, the display rule processor 35 is requested to display the selected image.

Figure 7:
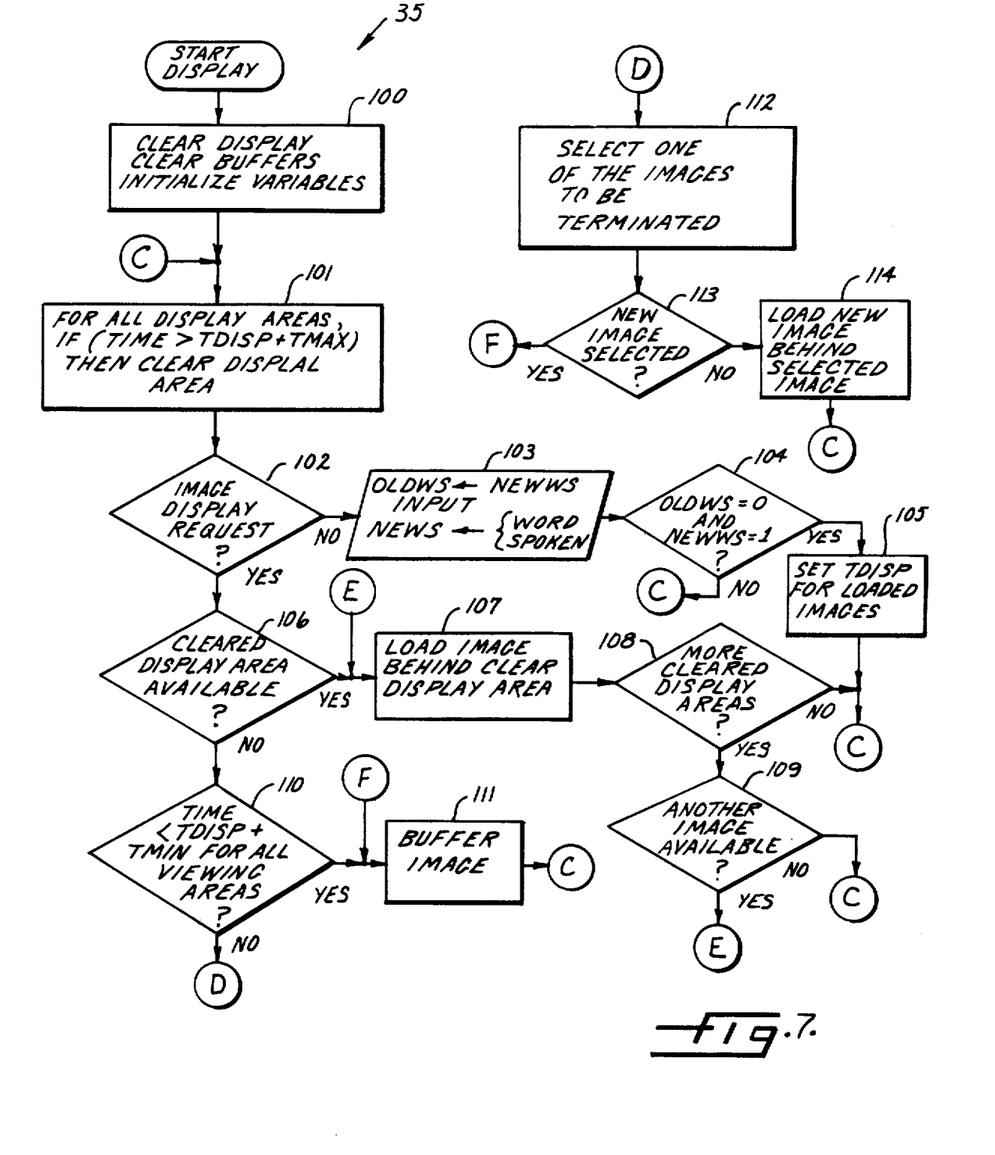
FIG. 7 is a flowchart of a computer procedure for the display rule processor block of the preferred embodiment shown in FIG. 2.

Turning now to FIG. 7 there is shown a flowchart of a procedure executed by the central processing unit 28 (FIG. 1) to implement the display rule processor 35 (FIG. 2). In the first step 100, the multiple image buffer 25 is cleared to clear the display, the display information buffer 40 is cleared, and program variables are initialized. In step 101, the respective clock times TDISP at which all of the images currently displayed were first displayed are added to the maximum display times TMAX for the respective images and compared to the current clock time TIME to determine whether any of the maximum viewing times have been exceeded. If so, then the respective display area are cleared. It should be noted that the display rule processor 35 knows both the display time TDISP and the maximum viewing time TMAX for each image being displayed since this information is stored in the display information buffer 40 for the respective images.

Next, in step 102, the display rule processor checks whether an image display request was received from the image selector 34. Usually an image display request is not found in step 102 since the display rule processor 35 periodically executes step 102 at a much faster rate than the rate at which new words are obtained by the image selector 34 from the text buffer 32. This is done so that the display rule processor may continually look in step 103 at the WORD SPOKEN signal from the speech synthesizer 26 in order to synchronize the loading of the multiple image buffer 25 with the display of the images having been loaded. In particular, the display rule processor 35 needs to know when the images are displayed in order to determine the display time TDISP and store the display time in the display information buffer 40 for the respective images. In step 103 a low-to-high transition of the WORD SPOKEN signal is sensed by saving the old value (OLDWS) of the word spoken signal and reading the WORD SPOKEN signal into a variable (NEWWS). In step 104 the low-to-high transition of the word spoken signal is sensed by logically comparing the old value to zero and logically comparing the current value to one. If there is a logical match, then an active transition of the WORD SPOKEN signal is sensed and in step 105, the display time TDISP for the loaded images is set to the current clock time. Execution then returns back to step 101 in order that step 102 is performed at a rate much faster than the rate at which new words are obtained by the image selector 34 from the text buffer 32.

If an image display request was sensed in step 102, then in step 106 the display information buffer 40 is read to determine whether an area or matrix element of the display 23 has been previously cleared. If so, then in step 107 the image to be displayed is loaded behind the cleared display area. This is done by the display rule processor 35 transmitting the address of the clear display area to the matrix address decoders 55 (FIG. 4) of the multiple image buffers 25, and sending a pulsed LOAD BUFFER signal to the multiple image buffer. Whenever an image is loaded or the display is cleared, the display information buffer 40 is updated to remember this fact. Next in step 108 the display information buffer 40 is again inspected to determine whether there are any more cleared display areas. If so, then in step 109, the display rule processor 35 interrogates the image selector 34 to determine if there are any other images available for display. If there are, execution jumps back to step 107 to load another image. If not, then execution jumps back to step 101.

If in step 106 a cleared display area was not available, then either the image requested to be displayed is not displayed, or an image currently being displayed must be terminated to make space available for the new image. The existing images, however, will not be terminated if none of them has been displayed for their respective minimum viewing times. Hence, in step 110 the current clock time (TIME) is compared to the sum of the display time (TDISP) and the minimum viewing time (TMIN) for the respective images being displayed. If the current time is less than all of these respective sums, then the new image cannot be displayed and could be buffered in step 111. The image selector 34 could request that these buffered images be displayed for subsequent words. Buffering of images in step 111, however, does introduce the problem that such buffered images cannot be displayed when their respective words are spoken by the speech synthesizer 26. Thus, buffering of the images in step 111 might not be desirable in many applications.

If in step 110 it was found that at least one of the images being displayed has been displayed for longer than its respected minimum display time, then one of these images or the new image selected cannot be displayed when the new word is spoken. Therefore, in step 112 one of the images currently being displayed or the new image must be selected for termination. Preferably the selection is performed as a decreasing function of the priority number associated with the image and also as a decreasing function of the difference between the current clock time TIME and the display time TDISP for the respected images. For each image, for example, the difference between the clock time and the display time in seconds is multiplied by three and subtracted from the priority number to give an indication of whether a particular image should still be displayed. The image with the minimum indication is selected for termination. If, as tested in step 113, the new image has been selected, then it could be buffered in step 111, and shown at a later time, although this has the disadvantage that it would not be shown when the corresponding word is spoken. If another image was selected, then in step 114 the new image is loaded behind the selected image so that it will be displayed in lieu of the selected image when its respective word is pronounced.

Shown in FIG. 2 was a 2×2 matrix of images on a cathode ray tube display 23. A cathode ray tube display is preferred for low cost applications of the present invention such as in a learning aid, especially for young children, and as an aid for teaching foreign languages. The present invention, however, is also useful for the generation of audio-visual presentations for a large viewer audience. In such a case, a more complex matrix display is preferred.

Figure 8:
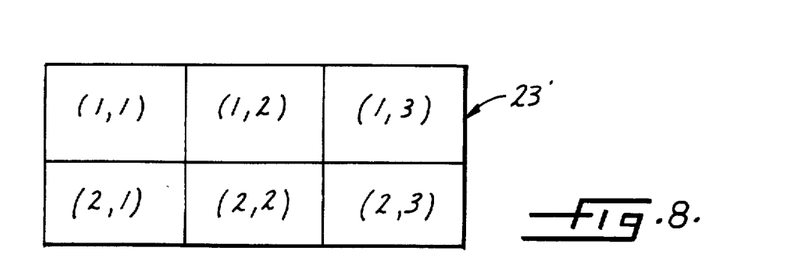
FIGS. 8–11 are pictorial diagrams of a preferred multi-image display for audio-visual presentations generated by a second embodiment of the present invention.
Figure 9:
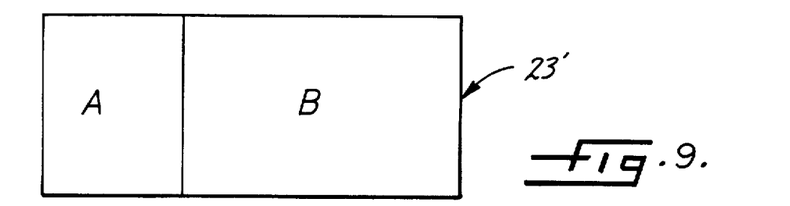
Figure 10:
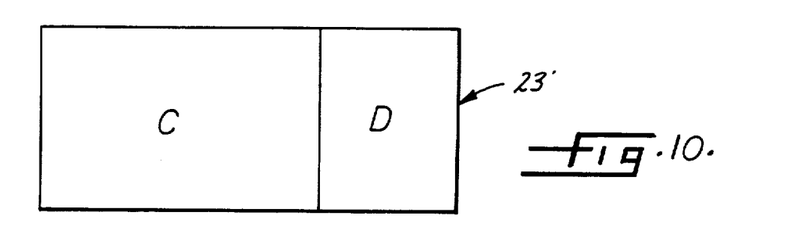
Figure 11:
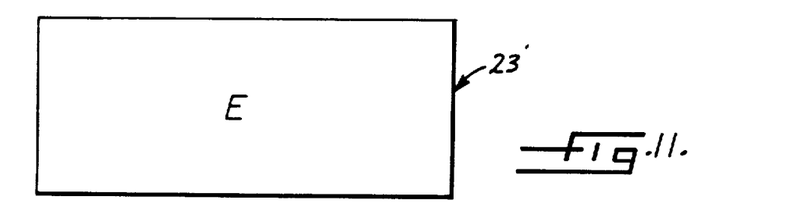

Shown in FIGS. 8-11 are various states of the same 2×3 multiple image matrix display 23'. Six independent images are displayed as shown in FIG. 8. Horizontal and vertical images A, B and C, D are displayed as shown in FIGS. 9 and 10, respectively. Shown in FIG. 11 is a full-screen image display E.

A separate buffer storage area should be provided for each of these images. Thus, the multiple image buffer for the display 23' should include six storage areas for the six matrix element images (1,1), (1,2), (1,3), (2,1), (2,2), (2,3) and five more storage areas for the images A, B, C, D and E. The appropriate images should be displayed depending on the desired format. A large screen projector is the preferred kind of video display for presenting these images and the number of images and the available display formats can be increased without departing from the spirit and scope of the invention.

Figure 12:
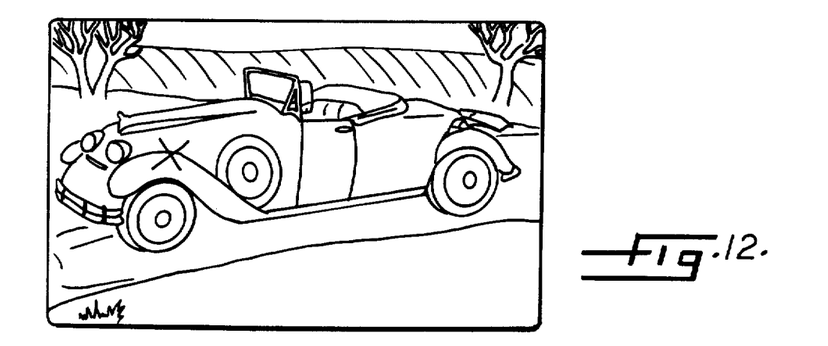
FIGS. 12–16 are pictorial representations of images displayed in the formats of FIGS. 9–11 to provide a visual translation of the script shown in Appendix III.

The inventor has used the kind of matrix display shown in FIGS. 8-11 for preparing audio-visual presentations by the prior art manual method of finding or creating pictures to go along with a script. A portion of the script is shown in Appendix III. The pictures to accompany the script are shown in FIGS. 12-16 and preferably the pictures are displayed in synchronism with the corresponding words of text which are underlined. It should be evident that the system according to the invention as described above could be used to simplify and accelerate the selection of pictures for an audiovisual presentation corresponding to the script shown in Appendix III. Once the video disk 29 and the image dictionary memory 30 have been loaded with a large number of high resolution pictures, the script is used as the natural language input to the system resulting in a series of pictures. This series of pictures is viewed and then edited by inserting selected control words as shown in Appendix II into selected positions in the script. It should be evident that the script itself becomes a program which is executed by the translation system to control the display in a desired fashion. For the script shown in Appendix III, the selection and display rules for the pictures should result in a fair presentation without the use of control words. A context rule, for example, could ensure that the automobile picture shown in FIG. 12 is generated in response to the words "wheel" and "automobile" being closely positioned. Similarily, the TELSTAR image shown in FIG. 15 would be selected by a context rule since the word "satellite" would be closely positioned to the words "television".

Figure 13:
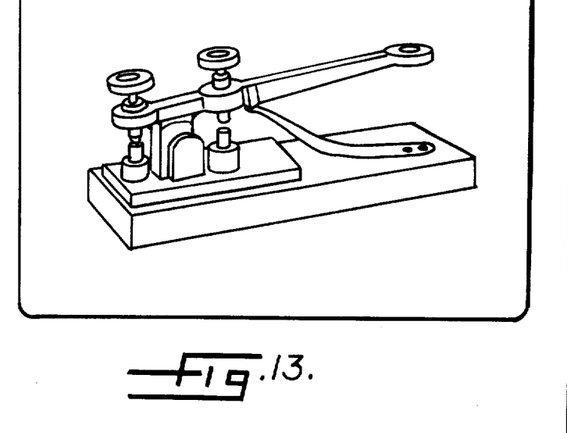
Figure 14:
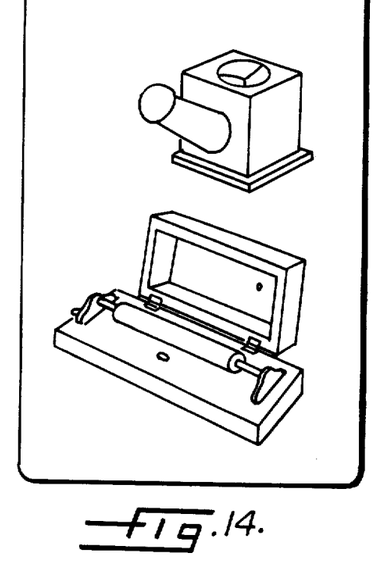
Figure 15:
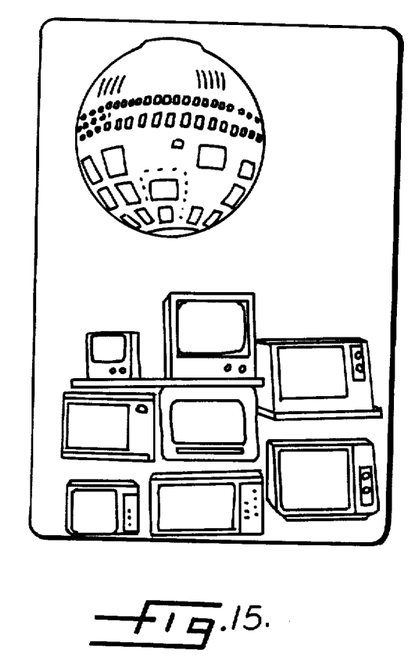
Figure 16:
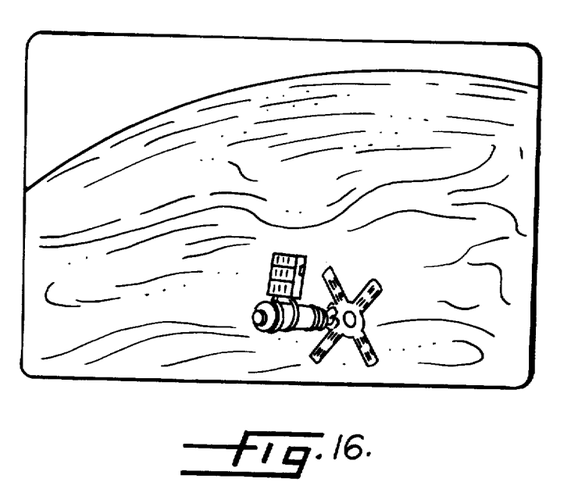

Viewer preferences are typically used to obtain pictures that the audience would like to see. A woman, for example, usually desires to see pictures including men rather than women. For the script of Appendix III, however, images could be selected on the basis of a historical viewer preference for the purpose of conveying a particular message. In the script, for example, the antique pictures shown in FIGS. 12-14 are selected for contrast with the modern pictures shown in FIGS. 15-16.

In view of the above, a system has been disclosed which automatically translates and processes with automatic computer generated programming a natural language text into a corresponding presentation of high resolution video images. To enhance the presentation, a speech synthesizer is used to pronounce the words as their respective pictures are displayed and a multiple image buffer is used to increase the pictorial information presented in parallel fashion to the viewer. The images are selected on the basis of the context in which particular words appear and viewer preferences. A number images can be provided to express the same idea, but redundancy of presentation can be avoided by random as well as indexed selection. Stored along with the images are respective display rules to ensure that the images are presented in an effective fashion as defined by the viewer. The natural language serves as the control program for automatic computer generated multi-image processing. Thus, individualized TV or multi-image programs can be created without new photography or recording or computer programming.

Books which are in digitized form can instantly become talking books with supportive pictorial presentations. Further, mail and long-distance communication can be enhanced. The system is then used as a "typewriter with images." In addition to use as a real-time translator as in learning applications, the system is also useful in generating an audio-visual presentation which can be further edited and images augmented by the use of control words and presented at a later time using the system.

APPENDIX I. IMAGE DICTIONARY MEMORY

CONCORDANCE

-continued

APPENDIX I. IMAGE DICTIONARY MEMORY

DOG: (3), INDEXED [1CF7], "DOG WAGGING TAIL", "DOG JUMPING", "DOG SLEEPING".

MUT: SEE, (1), DOG.

PET: SEE, (2), DOG 60%, CAT 40%.

WAR: CONTEXT NUCLEAR/1, SEQUENTIAL SEE (3) ICBM, NUCLEAR EXPLOSION, RUINS.

EOF
IMAGE DESCRIPTIONS

"DOG WAGGING TAIL"
DISC NO.: 2
NO. TRACKS: 1
TRACK 1: 147
VIEW TIME MAX: 3.0
VIEW TIME MIN: 0.3
PRIORITY: 3
VIEWER PREFERENCE: NONE
NO. CONTEXTS: 1
CONTEX 1: WAGGING/7
VIEW TIME MIN: 0.5
PRIORITY: 5

EOF

APPENDIX II. CONTROL WORDS

| | |
|---|---|
| $DISPLAY | Display next image with absolute priority |
| $DISPLAY-WORDX | Display an image for WORDX (WORDX is not pronounced) |
| $DISPLAY-"RECORD DESCRIPTION" | Display an image matching the RECORD DESCRIPTION |
| $DISPLAY-[DISC(I), TRACK(J)] | Display image at an absolute video address |
| $INHIBIT | Do not display next image or any next image meeting optional limitation |
| $PRIORITY(X) | Reset priority to X for next image or any next image meeting optional limitation |
| $TIMEMAX(X) | Reset maximum time to X for next image or any next image meeting optional limitation |
| $TIMEMIN(X) | Reset minimum time to X for next image or any next image meeting optional limitation |
| $VIEWPREF(DESC) | Reset viewer preferences to DESC for all successive images |
| $LOCATION(N) | Display next image at specified display location N. |
| $SEQUENTIAL | Buffer multiple images, meeting description of next word to be translated, into override RAM and display them once each following spoken word |

APPENDIX III's. SAMPLE MULTI-IMAGE SCRIPT

Throughout history each major technological advance has brought us to a new plateau . . . a quantum leap forward.

The <u>wheel</u> . . . <u>the automobile</u> . . . the printing press . . . typewriter . . . *telegraph* . . . *telephone* . . . each has given us remarkable wealth, more freedom and security.

*Television* . . . cameras . . . copying machines . . . computers . . . robots and *communication satellites* are shining examples of the triumph of human imagination and drive.

Great PROFITS are achieved by leadership with vision, understanding and determination to SEIZE emerging opportunities.

What is claimed is:

1. A visual communication device for translating a natural language into visual images to be viewed by a human receiver comprising, in combination, video memory means for storing a plurality of predetermined video images at predetermined image addresses, video display means for displaying selected images from said video memory to said human receiver, image dictionary memory means for storing predetermined sets of said image addresses associated with respective ones of a predetermined set of natural language words and addressable to obtain the respective stored set of image addresses for a selected natural language word, input means for receiving selected natural language words, and control means for repetitively obtaining individual ones of the selected natural language words from said input means, addressing said image dictionary memory means to obtain the respective sets of image addresses for the selected natural language words, and addressing said video memory means at the respective sets of image addresses to obtain images for display by said video display for viewing by said human receiver, so that the selected natural language words are automatically translated into a succession of visual images for viewing by said human receiver.

2. The visual communication device as claimed in claim 1, further comprising multiple image buffer means for receiving a selected plurality of images from said video memory means and wherein said video display means has a plurality of display areas for displaying respective ones of the images stored in said multiple image buffer means.

3. The visual communication device as claimed in claim 2, wherein said image dictionary memory means includes predetermined display rules stored for respective ones of the sets of said image addresses, said display rules specifying particular methods by which their respective images are displayed by said video display means.

4. The visual communication device as claimed in claim 3, wherein said display rules specify the time sequence in which particular images in respective sets of images are displayed.

5. The visual communication device as claimed in claim 3, wherein said display rules specify the time durations for which particular images in respective sets of images are displayed.

6. The visual communication device as claimed in claim 3, wherein said display rules specify the particular display areas and image placements at which particular images in respective sets of images are displayed.

7. The visual communication device as claimed in claim 3, wherein said display rules include priority descriptions for particular images in respective sets of images and wherein said particular images are selectively displayed in response to comparison of their respective priority descriptions.

8. The visual communication device as claimed in claim 3, wherein said display areas are arranged in a rectangular matrix.

9. The visual communication device as claimed in claim 3, wherein the control unit includes a display information buffer for temporarily storing the display rules obtained by addressing the image dictionary memory means in response to a sequence of words received by said input means, and a display rule processor for controlling the addressing of the video display means in response to the display rules stored in said display information buffer.

10. The visual communication device as claimed in claim 9, wherein said control unit further includes a display state register storing the control information generated by said display rule processor, and wherein said rule processor is responsive to the information stored in said display state register.

11. The visual communications device as claimed in claim 3, wherein said control means includes means for recognizing a predetermined set of control words interspersed in the selected natural language words received by said input means, and upon recognizing said control words executing said control words to override specified ones of the display rules.

12. The visual communications device as claimed in claim 11, wherein said predetermined set of control words includes control words for inhibiting the display of a specified image and displaying a specified image.

13. The visual communications device as claimed in claim 1, wherein at least some of said natural language words each have a plurality of image addresses associated therewith and stored in said image dictionary memory means, and said control means includes selector means for choosing for display a particular one of the plurality of images when a plurality of such image addresses are obtained by the addressing of said image dictionary memory means.

14. The visual communication device as claimed in claim 13, wherein said selector means chooses a particular one of the plurality of images at random.

15. The visual communications device as claimed in claim 13, wherein said image dictionary memory means has stored along with at least some of said plurality of images a pointer to a predetermined random access memory location, and said selector means including means for addressing said predetermined random access memory location, using the contents at said memory location to choose a particular one of the plurality of said images, and changing the contents at said memory location to avoid the redundant selection of a particular one of the plurality of images.

16. The visual communications device as claimed in claim 15, wherein the predetermined memory locations are initially set to predetermined initial values and iteratively cycled through permissible values by said means for choosing.

17. The visual communications system as claimed in claim 13, further comprising text buffer means for storing a plurality of said natural language words occurring in time sequence over a duration including the natural language word currently addressing said image dictionary memory means, wherein said image dictionary memory means has stored along with the image addresses of at least some of said plurality of images a context description, and wherein the choosing by said selection means is responsive to a comparison between the context description and the contents of said text buffer means.

18. The visual communications device as claimed in claim 13, further comprising means for receiving viewer preferences, wherein said image dictionary memory means has stored along with the image addresses of at least some of said plurality of images a viewer preference description, and wherein the choosing by said selector means is responsive to a comparison between the viewer preferences and the viewer preference description.

19. The visual communication device as claimed in claim 1, further comprising speech synthesizer means for pronouncing said natural language words received from said input means coincident with the display of the corresponding video images, and means for transmitting said pronunciations to said human receiver.

20. The visual communications device as claimed in claim 19, further comprising means for synchronizing the pronunciations of said natural language words with the display of corresponding images.

21. The visual communications device as claimed in claim 20, wherein said speech synthesizer means generated a signal at the start of the pronunciation of a word, and further comprising buffer means responsive to said signal for delaying the display of said video images until said signal is received from said speech synthesizer.

22. A multi-image communciations system for translating a sequence of natural language words into a corresponding audio-visual presentation directed to at least one human receiver, said system comprising, in combination,
    input means for receiving said sequence of natural language words,
    speech synthesizer means for sequentially receiving said natural language words and pronouncing them,
    video memory means for storing a plurality of predetermined video images corresponding to a substantial portion of the natural language words used in said natural language,
    video display means for simultaneously displaying a plurality of selected ones of said video images,
    image dictionary memory means for storing for each word in said substantial portion of the natural language words the set of addresses in said video memory means of corresponding ones of said video images and for storing display rules for respective ones of said video images, said display rules specifying particular methods by which their respective images are displayed by said video display means, and
    control means for obtaining individual ones of said natural language words received by said input means, addressing said image dictionary means to obtain the respective sets of image addresses for the selected natural language words and their respective display rules, addressing said video memory means at the respective sets of image addresses to obtain images for display by said video display, and controlling the video display in accordance with the respective display rules so that said sequence of natural language words is translated in real time to a corresponding audio visual presentation.

23. The system as claimed in claim 22 wherein said video memory means includes a laser video disc.

24. The visual communications system as claimed in claim 22, further comprising means for synchronizing the pronunciations of said natural language words with the display of corresponding images.

25. The system as claimed in claim 22, wherein said speech synthesizer means generates a signal at the start of the pronunciation of a word, said system further comprising buffer means responsive to said signal whereby the display of said video images is delayed until said signal is received from said speech synthesizer.

26. The system as claimed in claim 22, wherein said display areas are arranged in a rectangular matrix.

27. The system as claimed in claim 22, wherein said display rules specify the time sequence in which particular images in respective sets of images are displayed.

28. The system as claimed in claim 22, wherein said display rules specify the time durations for which particular images in respective sets of images are displayed.

29. The system as claimed in claim 22, wherein said display rules specify the particular display areas at which particular images in respective sets of images are displayed.

30. The system as claimed in claim 22, wherein said display rules include priority descriptions for particular images in respective sets of images and wherein said particular images are selectively displayed in response to comparison of their respective priority descriptions.

31. The system as claimed in claim 22, wherein the control unit includes a display information buffer for temporarily storing the display rules obtained by addressing the image dictionary memory means in response to a sequence of words received by said input means, and a display rule processor for controlling the addressing of the video display means in response to the display rules stored in said display information buffer.

32. The system as claimed in claim 22, wherein said control unit further includes a display state register storing the control information generated by said display rule processor, and wherein said rule processor is responsive to the information stored in said display state register.

33. The system as claimed in claim 22, wherein said control means includes means for recognizing a predetermined set of control words interspersed in the selected natural language words received by said input means, and upon recognizing said control words executing said control words to override specified ones of the display rules.

34. The system as claimed in claim 33, wherein said predetermined set of control words includes control words for inhibiting the display of a specified image and displaying a specified image.

35. The system as claimed in claim 22, wherein at least some of said natural language words each have a plurality of image addresses associated therewith and stored in said image dictionary memory means, and said control means includes selector means for choosing for display a particular one of the plurality of images when a plurality of such image addresses are obtained by the addressing of said image dictionary memory means.

36. The system as claimed in claim 35, wherein said selector means chooses a particular one of said plurality of images at random.

37. The system as claimed in claim 35, wherein said image dictionary memory means has stored along with at least some of said plurality of images a pointer to a predetermined random access memory location, and said selector means including means for addressing said predetermined random access memory location, using the contents at said memory location to choose a particular one of the plurality of said images, and changing the contents at said memory location to avoid the redundant selection of a particular one of the plurality of images.

38. The system as claimed in claim 37, wherein the predetermined memory locations are initially set to predetermined initial values and iteratively cycled through permissible values by said means for choosing.

39. The system as claimed in claim 35, further comprising text buffer means for storing a plurality of said natural language words occurring in time sequence over a duration including the natural language word currently addressing said image dictionary memory means, wherein said image dictionary memory means has stored along with the image addresses of at least some of said plurality of images a context description, and wherein the choosing by said selection means is responsive to a comparison between the context description and the contents of said text buffer means.

40. The system as claimed in claim 35, further comprising means for receiving viewer preferences, wherein said image dictionary memory means has stored along with the image addresses of at least some of said plurality of images a viewer preference description, and wherein the choosing by said selector means is responsive to a comparison between the viewer preference and the viewer preferences descriptions.

41. A multi-image communcations system for translating a sequence of natural language words into a corresponding audio-visual presentation directed to at least one human receiver, said system comprising, in combination, input means for receiving said sequence of natural language words, speech synthesizer means for sequentially receiving said natural language words and pronouncing them and including a text buffer storing a plurality of sequential ones of said natural language words, video memory means for storing a plurality of predetermined video images corresponding to a substantial portion of the natural language words used in said natural language, video display means for simultaneously displaying a plurality of selected ones of said video images, image dictionary memory means for storing for each word in said substantial portion of the natural language words the set of addresses in said video memory means of corresponding ones of said video images, for storing display rules for respective ones of said images for specifying particular methods by which their respective images are displayed by said video display means, for storing context rules for specifying particular methods by which respective images are selected for display for some of the words in said substantial portion of the natural language words in response to the words currently stored in said text buffer, and for storing viewer preference descriptions for specifying whether respective images meet predetermined viewer preferences, means for receiving viewer preferences, image selector means for obtaining individual ones of said natural language words received by said input means, addressing said image dictionary memory means to obtain the respective sets of image addresses for the selected natural language words and their associated display and context rules and viewer preference descriptions, applying said context rules and said viewer preference descriptions to select image addresses of respective images in said video memory means for display by said video display means, and display rule processor for applying said display rules and controlling said video display to display the respective video images from said video memory means in accordance with said display rules.

* * * * *